United States Patent [19]
Deibig et al.

[11] Patent Number: 5,094,912
[45] Date of Patent: Mar. 10, 1992

[54] SOLUBLE ADHESIVE FILMS

[75] Inventors: Heinrich Deibig, Guensberg; Albrecht Dinkelaker, Biberist; Klaus Rossmann, Wolfisberg, all of Switzerland

[73] Assignee: Belland AG, Solothurn, Switzerland

[21] Appl. No.: 268,018

[22] Filed: Nov. 7, 1988

[30] Foreign Application Priority Data

Nov. 14, 1987 [DE] Fed. Rep. of Germany ....... 3738786

[51] Int. Cl.$^5$ .......................... C09J 9/00; C09J 133/08; B32B 7/10
[52] U.S. Cl. .................................... 428/355; 428/345; 428/520
[58] Field of Search ................ 428/346, 355, 520, 343

[56] References Cited

U.S. PATENT DOCUMENTS

| | | | |
|---|---|---|---|
| 3,936,571 | 2/1976 | Van Hoof | 428/343 |
| 4,444,839 | 4/1984 | Dudzik | 428/346 |
| 4,612,355 | 9/1986 | Belz | 526/88 |
| 4,870,148 | 9/1989 | Belz | 526/318.44 |

FOREIGN PATENT DOCUMENTS

| | | |
|---|---|---|
| 3335954 | 4/1985 | Fed. Rep. of Germany . |
| 3335468 | 5/1985 | Fed. Rep. of Germany . |
| 3435468 | 4/1986 | Fed. Rep. of Germany . |
| 3620145 | 12/1987 | Fed. Rep. of Germany . |

Primary Examiner—Jenna Davis
Attorney, Agent, or Firm—Lackenbach Siegel Marzulla & Aronson

[57] ABSTRACT

The invention relates to an adhesive film, such as a label system or the like, formed from a film of a copolymer of acrylic and/or methacrylic acid, as well as acrylate and/or methacrylate soluble in aqueous alkali and an adhesive applied to the film and which is soluble in aqueous alkali. The adhesive film as a whole is dissolvable in the aqueous alkali and is suitable, particularly in colored printed form, for water-resistant labels, but which are easily removable in aqueous alkali. The copolymer can be recovered again from the aqueous system by a precipitation with acid.

12 Claims, No Drawings

SOLUBLE ADHESIVE FILMS

DESCRIPTION

The present invention relates to an adhesive film dissolvable in an aqueous alkali and in particular to a label system or the like.

During the industrial cleaning of containers of all types, such as boxes and crates and more particularly disposable and reusable bottles made from glass or plastics, problems occur. This is mainly in connection with the removal of labels from bottles, specifically in the beverages industry. Thus, the labels are generally only detached with difficulty in the rinsing liquid and with the residues of the adhesives froth and foam form, which can considerably impede rapidly operating cleaning plants. The detached flat structures of the labels also lead to blockages of screens, drains and pumps. It is frequently also desirable to be able to remove in a satisfactory manner inscriptions and the like from other objects such as shop windows, placard surfaces, car window panes, etc. Therefore film and label systems are required, which can be easily removed again. A good disposal of the residues, particularly rinsing waters is also desired.

Adhesive film has been found, which avoids these disadvantages and has the desired characteristics. The adhesive film according to the invention dissolves in aqueous alkali and is characterized by a) a carrier of a copolymer of acrylic acid and/or methacrylic acid, as well as at least one acrylate and/or methacrylate which is soluble in aqueous alkali and b) an adhesive soluble in aqueous alkali.

The adhesive film according to the invention is not only detachable, but is also completely dissolvable. It is particularly advantageous in the construction of the inventive adhesive film as a label or label system. Unlike the known, water-soluble labels based on polyvinyl alcohol, the labels according to the invention are completely soluble in the rinsing liquids of the rapidly operating bottle cleaning plants, because said rinsing liquids are adjusted alkaline. However, polyvinyl alcohol-based labels are difficult to dissolve in an alkaline medium. Moreover, there are no problems with dropped off labels and no fibrous mass is formed. Instead the rinsing liquid containing the adhesive film in dissolved form can be easily pumped away. This prevents blockages to filters, screens and pumps. However, the adhesive film according to the invention is also water-resistant in the stuck on state. Therefore neutral or acid water, e.g. rain water is not harmful. An important advantage of the inventive film is that the copolymer dissolved in aqueous alkali can be reprecipitated and separated in a separate process by simple acidification. Thus, not only the water is freed from polymer, but the latter can be reused for many purposes. The washing water can also be reused for dissolving purposes after its pH-value has been displaced into the alkaline range. This makes it possible to save considerable waste water quantities.

The carrier is preferably of the type described in DE-OS 34 35 468 same as U.S. Pat. No. 4,870,148. It can be shaped by a slot die or produced as a blown film. The copolymer can advantageously be produced in an extruder by radical polymerization of the corresponding monomers. The adhesive can be a conventional water-soluble adhesive, but is preferably an adhesive which is water-resistant per se, but is soluble in aqueous alkali. With particular advantage the adhesive is also a copolymer of acrylic and/or methacrylic acid, as well as at least one acrylate and/or methacrylate. Preference is given to acrylate and acrylates with alcohol groups with 2 to 18 carbon atoms, particularly 3 to 6 carbon atoms lead to good adhesive characteristics, particularly for contact adhesives. Butyl acrylate is preferred. Advantageously the molar ratio is 3 to 4 mol of acrylate per mol of monocarboxylic acid.

The adhesive can be a contact adhesive having permanent adhesive characteristics. However, it can also be a solvent or dispersion adhesive. Solutions of solid copolymers can also be used for solvent adhesives. The dispersion adhesives are preferably of the type of the dispersions described in German Patent 36 20 145. The carrier can already be coated with the adhesive and optionally protected by a top or cover film or the like. However, it is also possible to provide an adhesive film system constituted by the carrier and a separate adhesive and the carrier is coated with the adhesive just prior to use. The carrier can be transparent and optionally coloured. If it is used as a label system, the carrier is preferably opaque, which can be achieved by incorporating pigments into the copolymer.

According to a preferred embodiment of the inventive adhesive film, the latter is at least zonally covered with at least one ink coating, particularly by printing. The printing ink is once again preferably soluble in aqueous alkali and is preferably insoluble in neutral to acid media. For this purpose the ink can contain as a binder a copolymer of acrylic and/or methacrylic acid, as well as at least one acrylate and/or methacrylate. The copolymer can once again be constituted in a similar manner to that of the adhesive and the carrier. A copolymer of ethyl acrylate and acrylic acid is preferred, a molar ratio of 4:1 being particularly favourable.

The carrier is advantageously substantially formed from a copolymer of ethyl acrylate and methacrylic acid with a molar ratio in the range 2:1 to 4:1, particularly 2.5:1 to 3:1. The molecular weight of the copolymer for the carrier adhesive and ink binder can be in the range 50,000 to 100,000, particularly 60,000 to 80,000.

The printing inks can contain organic solvents, in which the copolymers are at least partly dissolved. However, preference is given to aqueous disperse dyes or inks, which are preferably free from organic solvents. The dyes can be constituted by standard printing colours and pigments, particularly black tints such as carbon black, white tints such as titanium dioxide or barium sulphate and the commercially available coloured tints.

The thickness of the adhesive film, can be adapted to the intended use and is generally between 10 and 500 μm, as a function of the desired strength. Film thicknesses of 20 to 70 μm are e.g. adequate for labels. The aqueous alkalis for dissolving the films can be constituted by solutions of alkali carbonates, alkali hydrogen carbonates, alkali metasilicates, alkali hydroxides, as well as ammonia solution, etc. For example the adhesive film, e.g. in the form of a printed label, dissolves in 1 to 4% soda or ammonia solution in a complete manner within a short time.

Further features of the invention can be gathered from the following description of preferred embodiments in conjunction with the subclaims. The individual features can be realized singly or in the form of random combinations.

EXAMPLE 5 kg of a granular material containing $TiO_2$ as the white pigment are extruded in an extrusion plant with a slot die to a flat film with a thickness of approximately 50 μm. As described in DE-OS 34 35 468, the granular material was previously polymerized by radical polymerization from ethyl acrylate and methacrylic acid with a molar ratio of 2.6:1 in the extruder. This film was subsequently coated on one side with a contact adhesive consisting of a copolymer of 3.0 mol of n-butyl acrylate per mol of acrylic acid and prepared as described in DE-OS 34 35 468. The adhesive has permanent adhesive characteristics and is solvent-free. The adhesive coating was covered with an easily removable, commercially available silicone paper.

The thus obtained adhesive film was covered with a stencil, after which a printing ink was applied to the free surfaces by means of an intaglio printing roll. The printing ink consisted of a 25% aqueous, coloured dispersion of a binder which, on the basis of its composition, is a copolymer of 4 mol ethyl acrylate and 1 mol methacrylic acid. The preparation once again took place in the manner described in DE-OS 34 35 468. As the dye, 65 g of blue pigment (LUCONYL BLAU 7 BASF-6900) was incorporated into the dispersion. The viscosity of the printing ink was adjusted to 22 seconds with a thickening agent (DIN-4 cup). Other pigments or pigment mixtures can be used in place of the aforementioned pigment to obtain the same result. The ink can also be applied by other conventional processes. After drying the ink 10×10 cm samples were punched from the film using a punching tool. Punching and grid removal took place without difficulty.

Samples of the thus prepared adhesive labels were stuck on bottles (glass or plastic) or drink crates (bottle crates). The bottles and crates were then stored, whilst being exposed to the normal conditions of use (such as rain, sunlight and the like), in order to check the durability of labels. The labels were flexible and had a good adhesion and appearance, even after prolonged storage. The bottles or crates were then treated with a weak alkaline cleaning solution, e.g. a 2% aqueous soda solution. The solution was sprayed with a sprinkler onto the product to be rinsed at room temperature. The labels, printing inks and adhesives detached completely within a few minutes.

The dissolved copolymer fraction was precipitated from the low-viscosity rinsing liquid by acidification with hydrochloric acid. The copolymer was obtained in the form of small fragments or lumps, which could be separated from the aqueous system by simple mechanical separating operations.

After increasing the pH-value to 9 to 10 by adding caustic soda solution and the addition of surfactants, the aqueous system could again be used for rinsing purposes. When the salt content had risen by repeating this cycle several times, in each case part of the salt-containing rinsing liquid was discharged and replaced by the supply of fresh water. This made it possible to significantly reduce the waste water quantity.

As the copolymers of the carrier, adhesive and ink are very similar to one another, the separated copolymer was reusable and could in particular be admixed with freshly prepared copolymer. As a result of its molecular composition, the copolymer can easily be burned, if no other reuse is desired.

The contact adhesive used in the example was prepared in the following way:

A mixture of 30 mol of n-butyl acrylate, 10 mol of acrylic acid, 5 mmol/mol of peroxide (LUPEROX 26 R of PENWALT, Grünzburg, German Federal Republic) and, additively based on the mixture described, 20% n-propanol, was continuously polymerized at 115° C. in accordance with DE-OS 33 35 468 on a reaction extruder, e.g. that of DE-OS 33 35 954.

A good contact adhesive is also obtained by polymerizing a mixture of 35 mol of n-butyl acrylate, 10 mol of acrylic acid, 10 mmol/mol of monomer mixture of n-dodecyl mercaptan, 5 mmol/mol of monomer mixture of peroxide (LUPEROX 26 R of Penwalt, Grünsburg, German Federal Repuplic) and, additively based on the described mixture, 20% n-propanol in a continuous manner at 115° C. according to DE-OS 34 35 468 on a reaction extruder, e.g. that of DE-OS 33 35 954.

In a following processing extruder (Compounder), the reaction mixture was freed from n-propanol and unpolymerized monomers and collected in sheet metal vessels.

The copolymer obtained is a high-viscosity contact adhesive with an inherent viscosity of 0.2 dl/g, measured on a 0.5% solution in dioxan. The acid number of the copolymer is 96 mg KOH/g. Apart from being soluble in aqueous bases, such as e.g. 1% ammonia solution or 3% soda solution, the copolymer can also be dissolved in organic solvents, such as e.g. ethanol, n-propanol, acetone, toluene and ethylacetate.

As stated, it is advantageously also possible to use a dispersion adhesive in place of the contact adhesive or solvent adhesive. The dispersion adhesive can be prepared from the aforementioned contact adhesive in the following way.

15 kg of the adhesive prepared in the aforementioned way are dissolved in a distillation apparatus in 35 kg of 2% ammonia solution. Ammonia together with water is then distilled off from the said solution until a dispersion is formed. The concentration of the dispersion is adjusted by further distilling off of water to a solids content of approximately 50%. The dispersion has the following characteristics: pH-value 6.1; viscosity 80 seconds (measured according to DIN 53 211, delivery cup, 4 mm die). For producing the adhesive film, said dispersion can be applied to the prepared and optionally already printed film. Following the evaporation of the water, the film is ready for use in the same way as the previously described, contact adhesive-coated film.

We claim:

1. An alkali-soluble, water-insoluble adhesive film comprising
   a) a copolymeric carrier of at least one acrylic ester and at least one acrylic acid, and
   b) a pressure-sensitive adhesive soluble in aqueous alkali whereby the entire construction can be removed and solubilized in alkaline solution and recovered thereafter by acidification.

2. The adhesive film of claim 1, wherein the soluble adhesive b) is also a copolymer of at least one acrylic acid and at least one acrylic ester.

3. The adhesive film of claim 2, wherein the soluble adhesive b) comprises a copolymer having a molar ratio of acrylate ester to at least one acrylic acid from 2.5 to 5 and the ester is of alcohols containing from 2 to 18 carbon atoms.

4. The adhesive film of claim 3, wherein the soluble adhesive b) further comprises zero to one mole of a termonomer.

5. The adhesive film of claim 3, further comprising:
c) a third layer on the carrier on the opposite side from the adhesive comprising a pigmented printing ink.

6. The adhesive film of claim 5, wherein the pigmented printing ink is soluble in aqueous alkali.

7. The adhesive film of claim 5, wherein the third layer c) a pigmented printing ink further comprises a copolymeric binder of at least one acrylic ester and at least one acrylic acid.

8. The adhesive film of claim 1, wherein the copolymeric carrier a) consists of a copolymer of ethyl acrylate and methacrylic acid having an ester/acid mole ratio from 2 to 4.

9. The adhesive film of claim 7, wherein the at least one acrylic ester is ethyl acrylate and the at least one acrylic acid is methacrylic acid in the third layer c).

10. The adhesive film of claim 3, wherein the molar ratio of acrylate ester to at least one acrylic acid in the soluble adhesive b) is from 3 to 4.

11. The adhesive film of claim 9, wherein the molar ratio of ethyl acrylate to methacrylic acid in the copolymeric third layer c) is about 4.

12. The adhesive film of claim 8, wherein the molar ratio of ethyl acrylate to methacrylic acid in the copolymeric carrier a) is from 2.5 to 3.

* * * * *